United States Patent
Koomullil et al.

(10) Patent No.: US 7,167,530 B2
(45) Date of Patent: Jan. 23, 2007

(54) ESTIMATION AND CORRECTION OF DC OFFSET IN THE PRESENCE OF FREQUENCY OFFSET

(75) Inventors: George P. Koomullil, Hayward, CA (US); Lawrence K. Chang, Sunnyvale, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 772 days.

(21) Appl. No.: 10/342,198

(22) Filed: Jan. 13, 2003

(65) Prior Publication Data

US 2003/0133518 A1    Jul. 17, 2003

Related U.S. Application Data

(60) Provisional application No. 60/347,673, filed on Jan. 11, 2002.

(51) Int. Cl.
H04L 27/00    (2006.01)

(52) U.S. Cl. ...................... 375/329; 375/319

(58) Field of Classification Search ........... 375/326, 375/324, 316–317, 319, 327
See application file for complete search history.

(56) References Cited

U.S. PATENT DOCUMENTS

| 6,725,024 B1 * | 4/2004 | Lindoff et al. ............ 455/255 |
| 6,868,128 B1 * | 3/2005 | Lane ..................... 375/319 |
| 6,904,098 B1 * | 6/2005 | Isaksen et al. ........... 375/261 |

* cited by examiner

*Primary Examiner*—Kevin Burd
(74) *Attorney, Agent, or Firm*—Withrow & Terranova, P.L.L.C.

(57) ABSTRACT

Systems and methods for estimating and correcting a DC offset in a receiver in the presence of a carrier frequency offset. Samples corresponding to a transmitted signal are received. Each sample is corrected for a carrier frequency offset. An average value is computed for a training sequence of the corrected samples, where the training sequence has a known DC offset. The average value is adjusted using an adjustment factor that reflects an effect on the DC offset of the act of correcting for a carrier frequency offset, thereby generating a DC offset estimate.

32 Claims, 5 Drawing Sheets

ESTIMATION AND CORRECTION OF DC OFFSET IN THE PRESENCE OF FREQUENCY OFFSET

CROSS-REFERENCES TO RELATED APPLICATIONS

This application claims the benefit of U.S. Provisional Application No. 60/347,673, filed Jan. 11, 2002, entitled "Estimation and Correction of DC Offset in the Presence of Frequency Offset," which disclosure is incorporated herein by reference for all purposes.

The present disclosure is related to the following commonly-assigned co-pending U.S. patent application Ser. No. 09/966,419, filed Sep. 27, 2001, entitled "Method and Apparatus for Time-Domain Combined Timing Acquisition and Initial Channel Estimation of OFDM Systems"; and Ser. No. 10/042,780, filed Jan. 8, 2002, entitled "Method and Apparatus for Frequency-Domain Tracking of Residual Frequency and Channel Estimation Offsets." The respective disclosures of these applications are incorporated herein by reference for all purposes.

BACKGROUND OF THE INVENTION

The present invention relates in general to wireless communication systems and in particular to systems and methods for estimating and correcting DC offset in the presence of carrier frequency offset.

Wireless personal communication devices have proliferated over the past several years. Integration of more functionality such as multimedia capabilities into these devices has created an increasing demand for enhanced broadband communication methodologies. In addition, the promise of convenient, portable access to e-mail and the World Wide Web has fueled demand for inexpensive, compact, low-power devices.

Wireless devices generally communicate using radio-frequency (RF) technologies, in which a carrier RF wave is modulated by a data signal having a signal frequency distribution. RF receivers are designed to receive the RF-modulated signal and extract the data signal for further processing. In digital communication systems, this further processing is generally done after conversion of the extracted analog signal back to the digital domain. In standard heterodyne receivers, the data signal is extracted by mixing the received RF signal with the output of a first local oscillator operating at a frequency less than the carrier frequency, thereby generating an intermediate-frequency (IF) signal. The IF signal is then filtered and amplified before being converted to the baseband. Conversion to the baseband generally involves mixing the IF signal with the output of a second local oscillator operating at the intermediate frequency.

Recently, there has been increased interest in direct-conversion, or zero-IF, receivers as an alternative to heterodyne architectures. In zero-IF receivers, there is one local oscillator operating at the carrier frequency, and the received signal is converted directly to the baseband without IF signal processing. Such receivers typically require simpler analog components than heterodyne receivers (e.g., analog filters and amplifiers for zero-IF receivers operate in the baseband rather than at a nonzero intermediate frequency) and consume less power. Because zero-IF receivers can operate at lower power and be more easily integrated into monolithic systems than heterodyne receivers, such receivers are recognized as potentially very useful for applications where low cost, low power consumption, and small size are important, such as various wireless mobile handheld devices.

Zero-IF receivers, however, are susceptible to noise from sources including DC offset and carrier frequency offset. "DC offset" refers to a nonzero voltage that appears at the mixer output in the absence of a data signal. DC offset is caused, for instance, by current leakage from the receiver's local oscillator (which operates at the carrier frequency) to the mixer or other RF components, e.g., an RF amplifier. This leakage current can be propagated into the mixer, leading to a DC offset in the baseband signal.

Carrier frequency offset (CFO) arises from the finite tolerance of RF components used in the transmitter and receiver. Even though the carrier frequency of the transmitter is usually known to the receiver, due to RF tolerance, the frequency at which the receiver operates may not match the transmitter frequency exactly. Additionally, in systems where the transmitter or receiver is mobile, Doppler effects may also give rise to carrier frequency offsets. This offset causes a time-dependent phase shift in the received signal after conversion to the baseband that can cause errors in reconstruction of the transmitted signal.

In the absence of CFO, DC offset can be measured and corrected in the digital domain using a training sequence included in the transmitted signal. For instance, the IEEE 802.11a standard for wireless communication provides for long and short training sequences to be included in the transmitted data. These training sequences are made up of symbols that do not include any DC component; in the absence of DC offset, the average of samples over a period of a training symbol would be zero. Thus, averaging received samples corresponding to symbols of either training sequence can be used to estimate DC offset. But CFO introduces a time-dependent phase shift that causes the average of samples over the training sequence period to be non-zero even in the absence of DC offset, rendering this technique unreliable.

It would therefore be desirable to provide a more reliable technique for estimating and correcting a DC offset in the digital domain in the presence of CFO.

BRIEF SUMMARY OF THE INVENTION

Embodiments of the present invention provide systems and methods for estimating and correcting a DC offset in a receiver in the presence of a carrier frequency offset (CFO). Samples of the received signal are corrected to compensate for CFO. Corrected samples corresponding to a training symbol or sequence having a known DC component (e.g., zero DC component) are then averaged, and the average is adjusted for the effect of the CFO correction, thereby yielding an estimate of the DC offset.

According to one aspect of the present invention, a method for estimating a DC offset in a radio frequency (RF) communication receiver is provided. Samples corresponding to a transmitted signal are received. Each of the received samples is corrected for a carrier frequency offset using a carrier frequency offset estimate, thereby generating corrected samples. An average value is computed for a sequence of the corrected samples corresponding to a training period of the transmitted signal, wherein the transmitted signal has a known DC component during the training period. An adjustment factor is computed, the adjustment factor reflecting an effect on the DC offset of the act of correcting for a carrier frequency offset. The average value is adjusted using the adjustment factor, thereby generating a DC offset estimate. In cases where the known DC component of the transmitted signal has a value not equal to zero, adjusting the average value may also include subtracting a value corresponding to the known DC component from the average value, thereby generating a difference value; the difference value is then multiplied by the adjustment factor to generate the DC offset estimate.

According to another aspect of the invention, a method for estimating and correcting for a DC offset in an RF communication receiver is provided. Samples corresponding to a transmitted signal are received. Each of the received samples is corrected for a DC offset using a first DC offset estimate, thereby generating first corrected samples. Each of the first corrected samples is further corrected for a carrier frequency offset using a carrier frequency offset estimate, thereby generating second corrected samples. An average value is computed for a sequence of the second corrected samples corresponding to a training period of the transmitted signal, wherein the transmitted signal has a known DC component during the training period. An adjustment factor is computed, the adjustment factor reflecting an effect on the DC offset of the act of correcting for a carrier frequency offset. The average value is adjusted using the adjustment factor, thereby generating a residual DC offset estimate. The first DC offset estimate is updated using the residual DC offset estimate.

According to yet another aspect of the invention, in a receiver for an RF communication system, a DC offset compensation circuit includes a subtraction circuit, a phase correction circuit, a first multiplier circuit, an averaging circuit, an adjustment circuit, and an updating circuit. The subtraction circuit is configured to subtract a stored DC offset value from a received signal, thereby producing a first corrected signal. The phase correction circuit is configured to compute a phase correction factor for each sample from a carrier frequency offset estimate. The first multiplier circuit is configured to multiply the first corrected signal by the phase correction factor, thereby producing a second corrected signal. The averaging circuit is configured to compute an average value of a sequence of second corrected signals corresponding to a training period of a transmitted signal, thereby generating an average signal value, wherein the transmitted signal has a known DC component during the training period. The adjustment circuit is configured to compute an adjustment factor reflecting an effect of the first multiplier circuit on the DC offset and to adjust the average signal value using the adjustment factor. The updating circuit is configured to update the stored DC offset value using the adjusted average signal value.

The following detailed description together with the accompanying drawings will provide a better understanding of the nature and advantages of the present invention.

DETAILED DESCRIPTION OF THE INVENTION

Embodiments of the present invention provide systems and methods for estimating and correcting a DC offset in a receiver in the presence of a carrier frequency offset (CFO). Samples of the received signal are corrected to compensate for CFO. Corrected samples corresponding to a training symbol or sequence having a known (e.g., zero) DC component are then averaged, and the average is adjusted for the effect of the CFO correction, thereby yielding an estimate of the DC offset.

Figure 1:
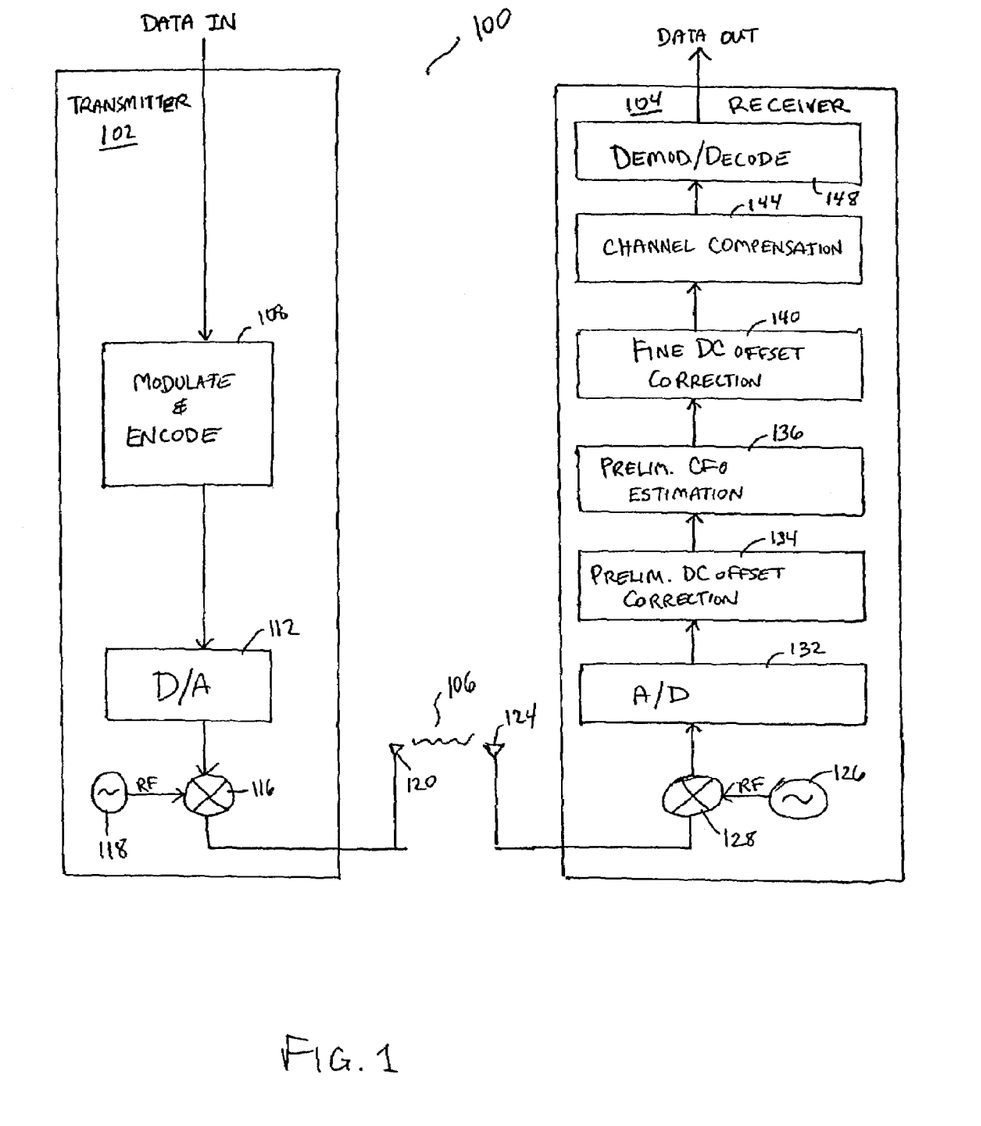
FIG. 1 is a block diagram of a digital communication system within an embodiment of the present invention is implemented.

Referring to FIG. 1, there is shown a simplified block diagram of a communication system 100 implementing OFDM according to an embodiment of the present invention. System 100 includes a transmitter 102 and a receiver 104 communicating via a channel 106. Transmitter 102 includes a signal modulator/encoder 108, a digital-to-analog converter 112, an RF modulator (mixer) 116, a local oscillator 118, and an antenna 120. An input data stream is modulated in the digital domain by signal modulator/encoder 108, which implements a data modulation scheme, e.g., orthogonal frequency division multiplexing (OFDM) according to the IEEE 802.11a standard. Signal modulator/encoder 108 can also implement various data encoding and/or forward-error correction schemes, a number of which are known in the art. Digital-to-analog converter 112 converts digital signals from signal modulator/encoder 108 to analog, and mixer 116 modulates the analog signal with a radio-frequency (RF) carrier signal provided by local oscillator 118. This modulated signal is provided to antenna 120 for transmission via channel 106.

Receiver 104 includes an antenna 124, a local oscillator 126, an RF mixer 128, an analog-to-digital converter 132, a preliminary (coarse) DC offset correction module 134, a preliminary carrier frequency offset (CFO) estimation module 136, a fine DC offset correction module 140, a channel compensation module 144, and a demodulator 148. Antenna 124 receives the transmitted RF signal from channel 106. The RF carrier is removed from the signal by mixer 128, and analog-to-digital converter 132 converts the signal to the digital domain. Preliminary DC offset correction module 134 estimates and corrects for DC offset introduced in the receiver electronics using techniques that ignore the effect of CFO; such techniques are known in the art. Preliminary CFO estimation module 136 generates an estimate of the CFO that is provided to downstream components. A number of techniques for estimating carrier frequency offset in the time domain are known in the art and may be applied in preliminary CFO estimation module 136. In one embodiment, preliminary CFO estimation module 136 does not correct the received data for the estimated CFO; instead, the estimated CFO is propagated to downstream components that apply appropriate corrections.

The signal is next provided to fine DC offset correction module 140, which computes and applies an additive correction to account for DC offset introduced in the receiver RF electronics. In accordance with an embodiment of the present invention, this DC offset correction accounts for the effect of CFO, as will be described below. By accounting for CFO effects, fine DC offset correction module 140 refines the DC offset estimate from preliminary DC offset correction module 134 and can improve the receiver's error rate. In one embodiment, fine DC offset correction module 140 also applies a CFO correction using the preliminary CFO estimate provided by preliminary CFO estimation module 136.

The DC-offset-corrected signal from DC offset correction module 140 is then provided to channel compensation module 144. Channel compensation module 144 estimates and corrects for effects of the channel on the received data stream. Various techniques for channel estimation and correction can be employed; examples are described in detail in the above-cross-referenced patent application Ser. No. 09/966,419. Channel compensation module 144 can also estimate and correct for residual CFO and/or clock frequency offset errors. Again, various techniques can be used; examples are described in detail in the above-cross-referenced patent application Ser. No. 10/042,780.

The corrected signal is then provided to demodulator/decoder 148, which reverses the modulation scheme used in signal modulator/encoder 108 of transmitter 102 to generate an output data stream. The operation of demodulator/decoder 148 is dependent on the modulation and/or encoding schemes implemented in signal modulator/encoder 108 of transmitter 102. Any suitable techniques for decoding and demodulating may be implemented in demodulator/decoder 148; a number of such techniques are known in the art.

It is to be understood that the data communication system as depicted in FIG. 1 is for illustrative purposes only and that, depending on the implementation, the system may include more or fewer functional blocks and that many variations are possible. For example, the system is not limited to the IEEE 802.11a standard, to OFDM or to any particular modulation scheme, and data may be encoded or not as desired. In addition, transmitter 102 and/or receiver 104 may be a dual-function transceiver unit, and a transceiver unit may use a common RF source (e.g., local oscillator) and/or a common antenna for both transmitting and receiving functions.

An algorithm employed by fine DC offset correction module 140 according to an embodiment of the present invention will now be described. The algorithm is based on observations regarding the effect of CFO correction on a received sequence of samples corresponding to a transmitted signal. A received sample y(n) in the digital domain of a signal distorted in the receiver by a CFO of $\Delta f$ and DC offset of c can be represented by:

$$y(n) = x(n)e^{j(\phi + 2\pi \Delta f n \Delta t)} + c, \quad (1)$$

where x is the transmitted signal, $\phi$ is an arbitrary phase (e.g., a phase offset between transmitter and receiver), $\Delta t$ is the time interval between samples, and n is a sample count. To the extent that the impulse response of the transmission channel does not include a DC component, the effect of the channel on the transmitted signal x can be ignored for the purposes of DC offset determination, as will be demonstrated below.

In the absence of CFO (i.e., where $\Delta f = 0$), the DC offset c can be determined by averaging the received signal y(n) over a set of P samples corresponding to a transmitted symbol (or sequence of symbols) that does not contain a DC component, such as symbols in either the long or short IEEE 802.11a training sequence. Averaging Equation (1) over a set of P samples yields:

$$\frac{1}{P}\sum_{n=1}^{P} y(n) = e^{j\phi}\frac{1}{P}\sum_{n=1}^{P} x(n) + c. \quad (2)$$

If the transmitted signal x(n) (n=0, 1, ..., P) corresponds to the training sequence, then the average of the transmitted signal over a full symbol period is 0. That is, $$\frac{1}{P}\sum_{n=1}^{P} x(n) = 0.$$

In the case of the IEEE 802.11a training sequences, P=64 can be used for the long training sequence, and P=16 can also be used for the short training sequence. Equation (2) shows that, in the absence of CFO, the DC offset c is equal to the average of the received samples y(n) corresponding to a transmitted sequence x(n) that has zero DC offset.

Note that for a channel effect h(n) on the transmitted signal x(n), the transmitted signal in Equation (1) becomes h(n)*x(n), where * denotes convolution. Nevertheless, the equality $$\frac{1}{P}\sum_{n=1}^{P} h(n) * x(n) = 0$$

holds as long as no DC component is present in either the transmitted signal or in the impulse response of the channel. Thus, for many communication systems, the effect of the channel can be neglected.

Where CFO is present, however, determination of the DC offset is complicated because it cannot be assumed that the first term on the right in equation (2) is zero. Removing the CFO from the received signal before averaging results in a time-dependent phase factor becoming associated with the DC offset. For instance, applying a CFO correction ($\Delta f_{est}$) to the received signal of Equation (1) yields:

$$z(n) = y(n)e^{-j2\pi \Delta f_{est} n \Delta t} = x(n)e^{j(\phi + 2\pi(\Delta f_{est} - \Delta f)n \Delta t)} + ce^{-j2\pi \Delta f_{est} n \Delta t}. \quad (3)$$

To the extent that the CFO correction is accurate, $\Delta f_{est} = \Delta f$, and:

$$z(n) = x(n)e^{j\phi} + ce^{-j2\pi \Delta f n \Delta t}. \quad (4)$$

Averaging z(n) over P samples (starting with an arbitrary sample number M+1) yields:

$$\langle z \rangle = \frac{1}{P}\sum_{n=1+M}^{P+M} z(n) = e^{j\phi}\frac{1}{P}\sum_{n=1+M}^{P+M} x(n) + c\frac{1}{P}\sum_{n=1+M}^{P+M} e^{-j2\pi \Delta f n \Delta t}. \quad (5)$$

If the P samples in Equation (5) correspond to a symbol (or sequence) with no DC component (such as either the long or short training sequence for IEEE 802.11a), then the first term in Equation (5) is zero, as discussed above. Equation (5) can then be rewritten as:

$$\langle z \rangle = \frac{c}{P}e^{-j2\pi((P/2)+M)\Delta f \Delta t}\sum_{k=-(P/2)+1}^{P/2} e^{-j2\pi \Delta f k \Delta t}. \quad (6)$$

This is equivalent to:

$$\langle z \rangle = ce^{-j2\pi((P/2)+M)\Delta f \Delta t}\text{sinc}(\Delta f P \Delta t), \quad (7)$$

where sin c x=(sin x)/x. Thus, the DC offset c is given by:

$$c = \langle z \rangle \frac{e^{j2\pi((P/2)+M)\Delta f \Delta t}}{\text{sinc}(\Delta f\, P\Delta t)}. \tag{8}$$

The presence of additive white Gaussian noise (AWGN) or other additive noise in the channel can introduce noise into the DC offset estimate of Equation (8). Under a wide range of operating conditions, such noise has only a negligible effect on system performance, and Equation (8) provides a reliable estimate of the DC offset.

Figure 2:
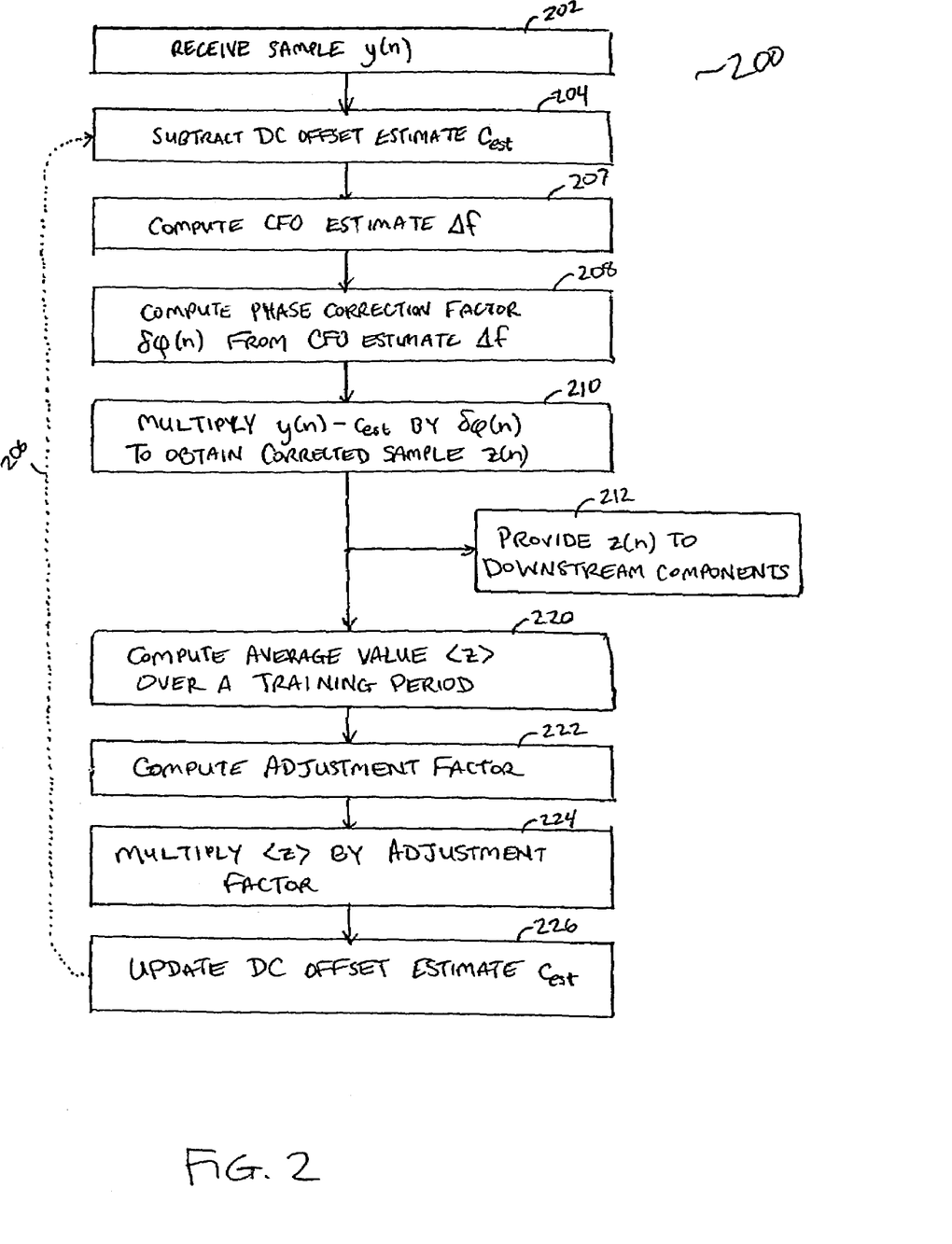
FIG. 2 is a flow chart of a process for estimating a DC offset according to an embodiment of the present invention.

Referring now to FIG. 2, there is shown a flow chart of a process 200 for computing a DC offset according to an embodiment of the invention. This process corrects a received signal for an estimated DC offset, then uses the corrected signal to refine the estimate in accordance with Equation (8). The refined estimate can then be used to correct subsequent samples. More specifically, at step 202, a sample y(n) of a signal is received. At step 204, y(n) is corrected for DC offset by subtracting a DC offset estimate $c_{est}$. Initially, the DC offset may be a coarse estimation; the estimate is then refined by a feedback loop in the algorithm (shown by dotted arrow 206 in FIG. 2). At step 207, an estimate of the CFO ($\Delta f$) is computed using the DC-offset-corrected value. The CFO estimate $\Delta f$ can be computed using various techniques, a number of which are known in the art. For example, CFO may be estimated by relying on the periodicity of a training sequence embedded in the data (e.g., the short or long IEEE 802.11a training sequence), using techniques known in the art. One skilled in the art will recognize that other techniques for estimating CFO may also be used, and a detailed description is omitted as not being crucial to understanding the present invention.

At step 208, the CFO estimate $\Delta f$ is used to compute a phase compensation factor $\delta\phi(n)=e^{-j2\pi\Delta f n \Delta t}$, where n is the sample number and $\Delta t$ is the interval between samples. At step 210, the corrected signal produced in step 204 is multiplied by the phase compensation factor $\delta\phi(n)$ from step 208, thereby generating a sample z(n) that has been corrected for both CFO and DC offset. This sample can be passed along to other receiver components at step 212.

In addition, when the received sample z(n) is part of an appropriate training sequence, the sample is also used in a feedback loop to update the DC offset estimate $c_{est}$. At step 220, the samples z(n) are averaged over a training period of the training sequence to generate an average value $\langle z \rangle$. The training period consists of P samples and can correspond, for instance, to a period of a training symbol in an IEEE 802.11(b) training sequence (e.g., 64 samples for the long training sequence or 16 samples for the short training sequence). At step 222, an adjustment factor equal to $$\frac{e^{j2\pi((P/2)+M)\Delta f \Delta t}}{\text{sinc}(\Delta f\, P\Delta t)}$$

is computed. At step 224, the adjustment factor is multiplied by the average value $\langle z \rangle$, thereby generating a DC offset estimate in accordance with Equation (8). Because the received samples were initially corrected for DC offset at step 204, the result is a residual DC offset error $c_{res}$. At step 226, the DC offset $c_{est}$ to be used for subsequent samples (at step 204) is updated using the residual error $c_{res}$. Step 226 can involve, e.g., averaging $c_{res}$ over a number of periods of the training sequence or performing other types of filtering prior to updating the value of $c_{est}$, thereby reducing the effect of short-term fluctuations on the data.

It is to be understood that the process of FIG. 2 is illustrative and that variations and modifications are possible. Steps shown sequentially can be executed in parallel, and the order of steps can be modified. In some embodiments, the CFO offset estimate can be computed using non-DC-corrected samples. Various techniques can be employed for computing the adjustment factor and the phase compensation factor; some examples will be described below. Providing the CFO-corrected sample to downstream components (step 212) is optional; systems can be implemented in which the CFO correction is applied in downstream components. Filtering of the residual DC offset estimate (step 226) is also optional, and where filtering is used, any form of filtering can be implemented.

In one alternative embodiment, it is not required that the DC component of the transmitted signal x(n) is zero, as long as the DC component has a known value at the receiver. As can be seen by substituting x(n)+d for x(n) in the equations above, the presence of a known DC component $de^{j\phi}$ can be corrected by subtracting the corresponding value from the average value $\langle z \rangle$ computed at step 220 prior to the multiplication at step 224. In some implementations, an estimate of the phase $\phi$ is required; such an estimate can be obtained using conventional techniques.

In an alternative embodiment, DC offset estimation can be performed without first subtracting any DC offset estimate from the received signal. The process is generally similar to process 200, except that DC offset correction at step 204 is not performed, and the resulting DC offset estimate at step 224 represents the total DC offset and not a residual component. Filtering can be performed to reduce noise in the estimate, substantially as described above.

Figure 3:
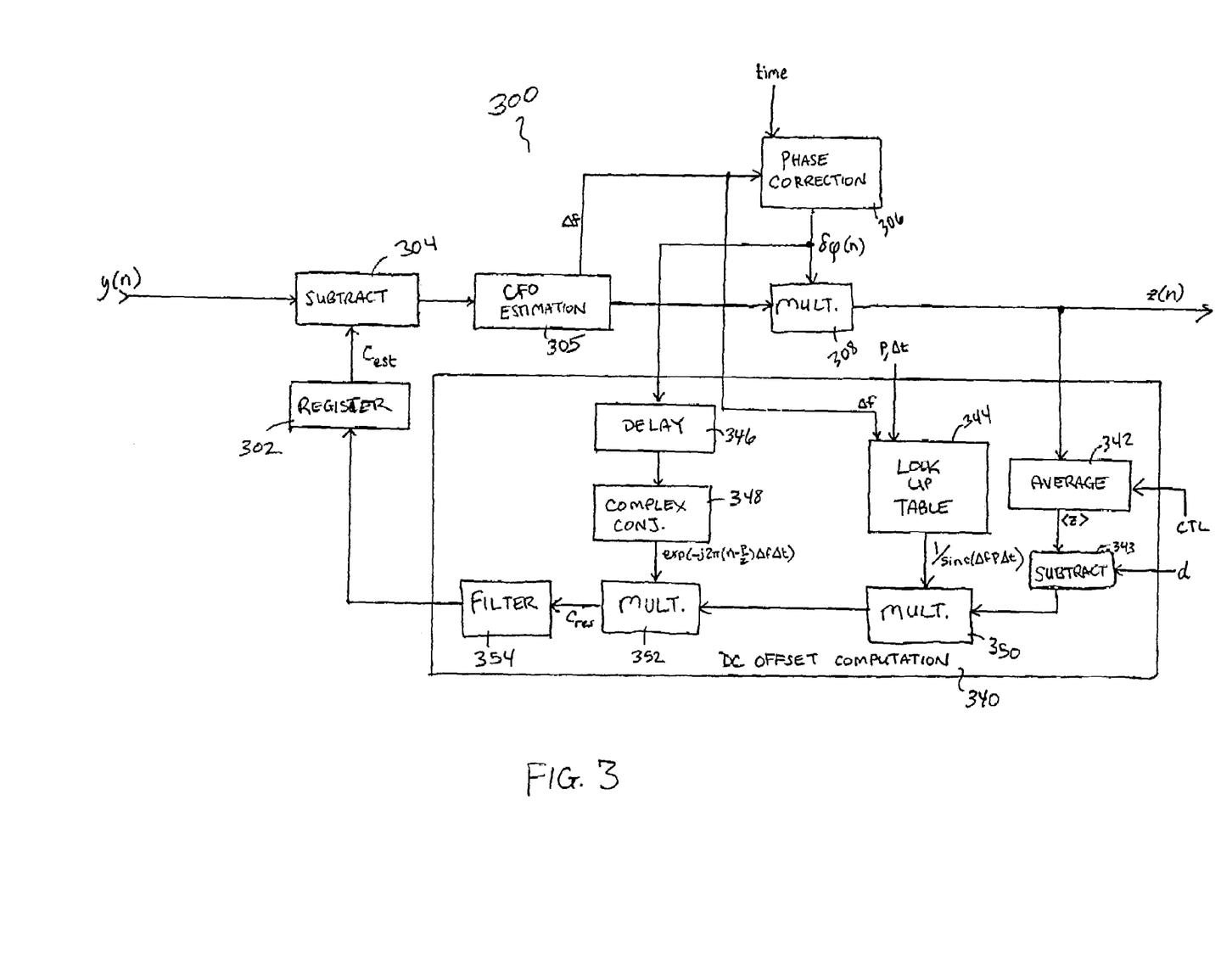
FIG. 3 is a block diagram of a circuit for estimating a DC offset according to an embodiment of the present invention.

FIG. 3 is a block diagram of an embodiment of a DC offset correction module 300 for a receiver according to an embodiment of the present invention. DC offset correction module implements process 200. A current estimate of the DC offset ($c_{est}$) is stored in a register 302. At system startup, this estimate can be initialized to zero or to any other desired value. As signals are received, DC offset correction module 300 updates the estimate as will be described. Incoming samples y(n) pass through a subtraction block 304, where the estimate $c_{est}$ is subtracted.

A CFO estimation block 305 generates a CFO estimate ($\Delta f$) from the DC-offset-corrected samples. CFO estimation block 305 can be implemented using a variety of techniques, as described above. The CFO estimate $\Delta f$ is provided to a phase correction generator 306, which computes a phase correction factor $\delta\phi(n)$ according to step 208 of process 200. Phase correction generator 306 uses values for the sample number n and the sampling interval $\Delta t$ that can be supplied by external time signals (as shown) or determined within phase correction generator 306, depending on implementation. In another embodiment, phase correction generator 306 receives a sample time $t_n$ (=$n\Delta t$) supplied by another component of the receiver (not shown). A complex multiplication unit 308 multiplies the propagating sample by $\delta\phi(n)$, thereby generating a sample z(n) that has been corrected for both DC offset and CFO. This sample can be provided to downstream signal-processing components.

The CFO-corrected sample z(n) and the phase correction factor $\delta\phi(n)$ are also provided to a DC offset computation block 340. DC offset computation block 340 contains hardware components enabling the computation of a DC offset c according to Equation (8): an averaging unit 342, a sinc-function lookup table 344, a delay circuit 346, a complex-conjugation circuit 348, first and second complex multipliers 350, 352, and a filter circuit 354.

Averaging unit 342 computes the average value of the samples over a training period containing a number of samples P. In one embodiment, the training sequence alternates with data-carrying signals, and the averaging unit receives control signals (CTL) indicating when the training sequence is in progress so that the samples averaged correspond to the training sequence. In another embodiment, the averaging unit operates continuously using a sliding window (e.g., the most recent P samples are averaged), and control signals are used to latch data in blocks 340 and/or 302 at appropriate times. At the end of the training period, averaging unit 342 produces an average sample value <z>. In embodiments where the known DC component of the training sequence has a nonzero value, a subtraction block 343 is provided to subtract a value (d) corresponding to the known DC component from the average sample value <z>.

Sinc function lookup table 344 receives the CFO offset estimate $\Delta f$ and provides the corresponding value of the function $1/\sin c(\Delta f P \Delta t)$ as an output. These values are advantageously computed in advance for a number of values of $\Delta f$ (and for applicable combinations of $P\Delta t$) and stored in the lookup table. The lookup table can be indexed by $\Delta f$, P, $\Delta t$, or any suitable combination of these values. The lookup table can also be implemented so as to perform interpolation between stored values of the sinc function's argument using well-known techniques. The value returned by lookup table 344 is provided to first complex multiplier 350, which multiplies the average signal by the sinc-function lookup result.

Delay circuit 346 receives the phase correction factor $\delta\phi(n)$ and delays it for half the period of the training sequence (e.g., by a number of samples P/2). Delay circuit 346 provides the delayed phase correction factor to complex conjugate circuit 348, which generates the complex conjugate of the delayed phase correction factor. Second complex multiplier 352 multiplies the respective outputs of first complex multiplier 350 and complex conjugate circuit 348, thereby generating the residual DC offset error $c_{res}$.

Filter circuit 354 is advantageously provided to reduce the effects of short-term fluctuations or noise on the DC offset estimation $c_{est}$ and therefore on the output signal z(n). In one embodiment, filter circuit 354 averages a number of the most recent values of $C_{res}$, where the number can be selected as desired. In another embodiment, a weighted average favoring more recent values is used. In general, any filtering technique can be implemented in filter circuit 354. Filter circuit 354 then uses the filtered value of $c_{res}$ to update the DC offset estimate $c_{est}$ stored in register 302. For instance, in one embodiment, the value of $c_{est}$ stored in register 302 is replaced by the algebraic sum of $c_{est}$ and the filtered $c_{res}$ value provided by filter circuit 354.

It is to be understood that the DC offset correction module described herein is illustrative and that modifications and variations are possible. For example, the various arithmetic components can be implemented using circuits within one or more application-specific integrated circuits (ASICs), one or more field-programmable gate arrays (FPGAs) or other programmable logic devices, firmware in a microcontroller or other programmable processor, or a variety of other technologies. As described above with regard to FIG. 2, in some embodiments, the transmitted signals corresponding to the samples used to compute the average signal <z> can include a known DC component; accordingly, a subtraction unit can be provided to remove the known component prior to multipliers 350, 352. The multiplication operations can be done in any order; for instance the respective output signals from complex conjugation unit 348 and sinc lookup table 344 can be multiplied first, and this result can be multiplied by the average signal <z>. The value of the adjustment factor may be determined in a variety of ways, and use of a lookup table is not required. The DC offset correction circuit can propagate any or all of the generated signals to downstream components. It will be appreciated that the DC offset correction module can be incorporated into a receiver architecture such as the one shown in FIG. 1 or into other architectures.

In an alternative embodiment, DC offset estimation can be performed using samples that have not been corrected for DC offset. A DC offset correction circuit implementing this embodiment can be similar to that shown in FIG. 3, except that multiplication unit 308 receives samples y(n) that have been corrected for CFO but not DC offset. The output signal from multiplier 352 corresponds to the total DC offset rather than to a residual component of DC offset. Filter circuit 354 can be used to reduce noise in the estimate, substantially as described above.

Figure 4:
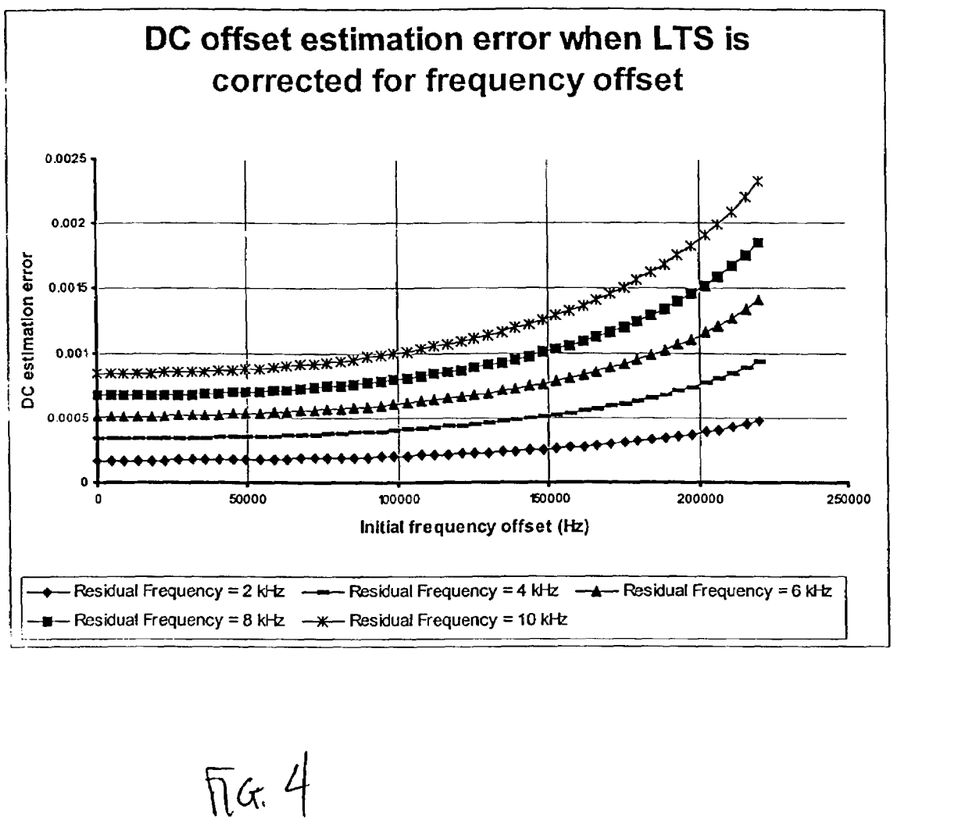
FIG. 4 is a graph illustrating simulated performance of a receiver according to an embodiment of the present invention.

As described above, DC offset estimation according to Equation (8) assumes that the error in the CFO estimation can be ignored, i.e., that $\Delta f_{est}=\Delta f$ in Equation (3). To the extent that this assumption is inaccurate, there is error (noise) present in the DC offset estimate. The magnitude of the error depends on how inaccurate $\Delta f_{est}$ is. For example, FIG. 4 is a graph showing the error in the DC offset estimate from a simulation of an IEEE 802.11a system in which CFO is estimated using the short training sequence and DC offset is estimated using the long training sequence. Each line corresponds to a different residual CFO error (from 2 kHz to 10 kHz) and is plotted as a function of the initial CFO. For comparison, it should be noted that estimating DC offset in the same system without accounting for CFO effects has an error of about $3\times10^{-3}$ volts for a signal of root mean square (RMS) value $80\times10^{-3}$ volts and an initial CFO of around 200 kHz.

In one embodiment, the noise due to residual CFO error can be reduced by performing CFO and DC offset estimation and correction iteratively. For example, a received sample can be corrected using initial estimates of DC offset and CFO offset. Using this corrected sample, the DC offset estimate can be refined using techniques described above, and the sample can be DC-corrected again using the refined estimate. This sample can in turn be used to estimate the residual CFO error. After correcting for this residual CFO error, another iteration of residual DC offset estimation and correction can then be performed, again using techniques described above. This process can be repeated as desired.

Figure 5:
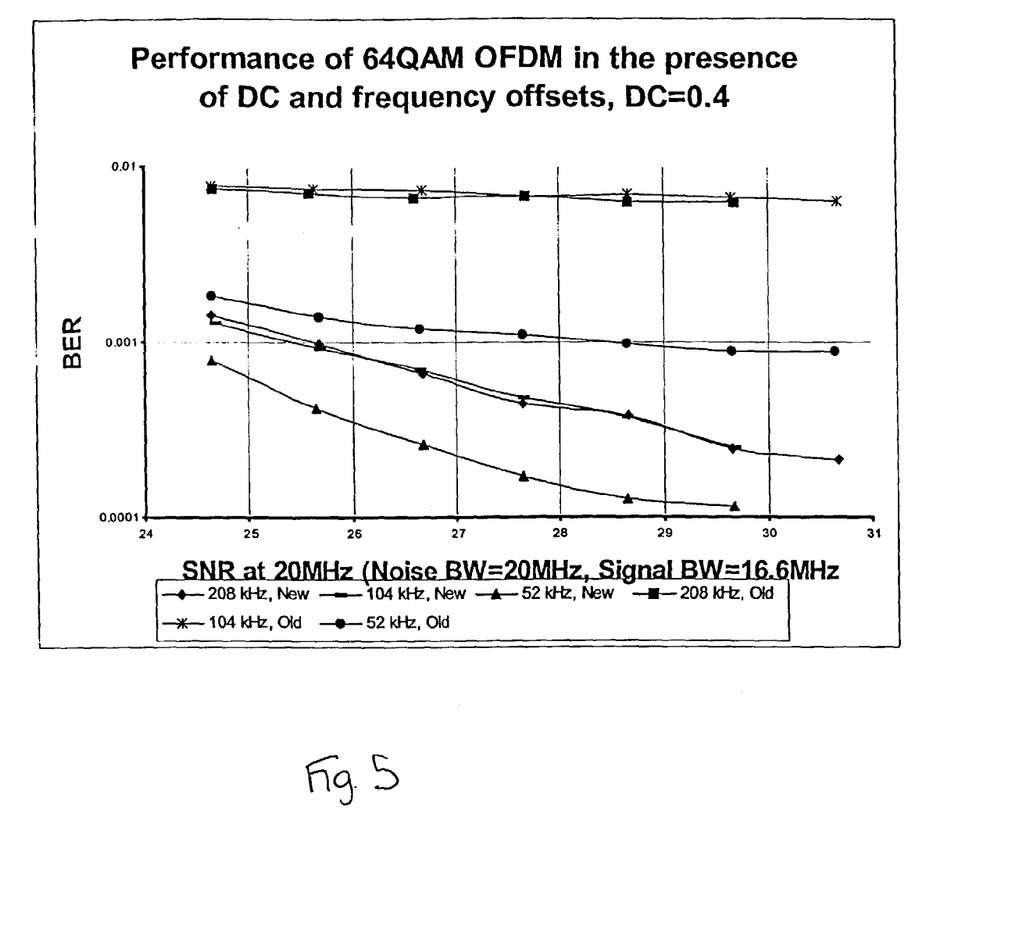
FIG. 5 is a graph comparing simulated performance of a receiver with and without DC offset correction according to an embodiment of the present invention.

FIG. 5 is a graph showing bit error rate (BER) as a function of signal-to-noise ratio (SNR) for various initial CFO values, for simulations of systems having DC offset correction according to conventional techniques ("old" data points) and according to a technique as described above ("new" data points). The graph illustrates that embodiments of the present invention can improve receiver performance.

Thus, in accordance with an embodiment of the invention, an algorithm and a corresponding hardware implementation are provided for estimating and correcting the DC offset in the presence of frequency offset in the received signals of an RF receiver. A sequence of signals with a known DC component (e.g., zero) is transmitted from a first transceiver or transmitter and received by a second transceiver or receiver. During the transmission and reception process, an additional DC component is added to the signals. The signals are digitized and processed in the second transceiver to estimate the additional DC component, taking into account the presence of carrier frequency offset (CFO) in the received signals. The DC offset estimate is then used to correct the DC component in the received signal.

While the invention has been described with respect to specific embodiments, one skilled in the art will recognize that numerous modifications are possible. For example, although reference has been made to the IEEE 802.11a standard, a variety of RF communication protocols can be used, including any protocol with a training sequence that does not include a DC component or that includes a DC component of known value. Further, inclusion of a training sequence in the transmitted data stream is not a requirement of the invention, as long as a sequence of signals with known DC component can be identified at the receiver end. The invention can be practiced using a variety of methods for estimating CFO. Any data modulation and/or encoding scheme can be used, not limited to OFDM modulation schemes. The receiver is not required to be a direct-conversion receiver; the techniques described herein can be adapted to any receiver that introduces DC offset. The DC correction techniques described herein can be also implemented in receivers with or without a preliminary DC correction.

Thus, although the invention has been described with respect to specific embodiments, it will be appreciated that the invention is intended to cover all modifications and equivalents within the scope of the following claims.

What is claimed is:

1. A method for estimating a DC offset in a radio frequency communication receiver, the method comprising:
   receiving a plurality of samples corresponding to a transmitted signal;
   correcting each of the received samples for a carrier frequency offset using a carrier frequency offset estimate, thereby generating a plurality of corrected samples;
   computing an average value of a sequence of the corrected samples corresponding to a training period of the transmitted signal, wherein the transmitted signal has a known DC component during the training period;
   computing an adjustment factor reflecting an effect on the DC offset of the act of correcting for a carrier frequency offset; and
   adjusting the average value using the adjustment factor, thereby generating a DC offset estimate.

2. The method of claim 1 wherein the known DC component of the transmitted signal is substantially equal to zero.

3. The method of claim 1 wherein the adjustment factor is given by the expression $$\frac{e^{j2\pi((P/2)+M)\Delta f \Delta t}}{\mathrm{sinc}(\Delta f P \Delta t)},$$

wherein:
P is a number of samples received during the training period;
M is a sample counter value corresponding to a first sample received during the training period;
Δt is a time interval between successive samples; and
Δf is the carrier frequency offset estimate.

4. The method of claim 1 wherein the act of correcting for a carrier frequency offset includes:
   computing a phase correction factor for each sample from the carrier frequency offset estimate;
   multiplying each of the first corrected samples by the corresponding phase correction factor.

5. The method of claim 4 wherein the act of computing an adjustment factor includes:
   delaying the phase correction factor for a time equal to half the training period; and
   performing a complex conjugation operation on the delayed phase correction factor.

6. The method of claim 5 wherein the act of computing an adjustment factor further includes:
   computing a sinc function of the product of the carrier frequency offset estimate times a time interval between samples times the number of samples received during the training period; and
   dividing the complex conjugate of the delayed phase correction factor by the sin c function.

7. The method of claim 6 wherein the act of adjusting the average value includes:
   multiplying the average value by the adjustment factor.

8. The method of claim 6 wherein the known DC component of the transmitted signal has a value not equal to zero and wherein the act of adjusting the average value includes:
   subtracting a value corresponding to the known DC component of the transmitted signal from the average value, thereby generating a difference value; and
   multiplying the difference value by the adjustment factor.

9. A method for estimating and correcting for a DC offset in a radio frequency communication receiver, comprising:
   receiving a plurality of samples corresponding to a transmitted signal;
   correcting each of the received samples for a DC offset using a first DC offset estimate, thereby generating a plurality of first corrected samples;
   correcting each of the first corrected samples for a carrier frequency offset using a carrier frequency offset estimate, thereby generating a plurality of second corrected samples;
   computing an average value of a sequence of the second corrected samples corresponding to a training period of the transmitted signal, wherein the transmitted signal has a known DC component during the training period;
   computing an adjustment factor reflecting an effect on the DC offset of the act of correcting for a carrier frequency offset;
   adjusting the average value using the adjustment factor, thereby generating a residual DC offset estimate; and
   updating the first DC offset estimate using the residual DC offset estimate.

10. The method of claim 9 wherein the known DC component of the transmitted signal is substantially equal to zero.

11. The method of claim 9 wherein the act of updating the first DC offset estimate includes:
    filtering the residual DC offset estimate; and
    combining the filtered residual DC offset estimate with the first DC offset estimate.

12. The method of claim 11 wherein the act of filtering includes:
    averaging a plurality of residual DC offset estimates.

13. The method of claim 9 wherein the act of correcting for a DC offset includes subtracting the first DC offset estimate from the received sample.

14. The method of claim 9 wherein the adjustment factor is given by the expression $$\frac{e^{j2\pi((P/2)+M)\Delta f \Delta t}}{\mathrm{sinc}(\Delta f\, P\Delta t)},$$

wherein:
P is a number of samples received during the training period;
M is a sample counter value corresponding to a first sample received during the training period;
Δt is a time interval between successive samples; and
Δf is the carrier frequency offset estimate.

15. The method of claim 9 wherein the act of correcting for a carrier frequency offset includes:
computing a phase correction factor for each sample from the carrier frequency offset estimate; and
multiplying each of the first corrected samples by the corresponding phase correction factor.

16. The method of claim 15 wherein the act of computing an adjustment factor includes:
delaying the phase correction factor for a time equal to half the training period; and
performing a complex conjugation operation on the delayed phase correction factor.

17. The method of claim 16 wherein the act of computing an adjustment factor further includes:
computing a sinc function of the product of the carrier frequency offset estimate times a time interval between samples times a number of samples received during the training period; and
dividing the complex conjugate of the delayed phase correction factor by the sinc function.

18. The method of claim 17 wherein the act of adjusting the average value includes:
multiplying the average value by the adjustment factor.

19. The method of claim 17 wherein the known DC component of the transmitted signal has a value not equal to zero and wherein the act of adjusting the average value includes:
subtracting a value corresponding to the known DC component of the transmitted signal from the average value, thereby generating a difference value; and
multiplying the difference value by the adjustment factor.

20. In a receiver for a radio frequency communication system, a DC offset compensation circuit comprising:
a first subtraction circuit configured to subtract a stored DC offset value from a received signal, thereby producing a first corrected signal;
a phase correction circuit configured to compute a phase correction factor from a carrier frequency offset estimate;
a first multiplier circuit configured to multiply the first corrected signal by the phase correction factor, thereby producing a second corrected signal;
an averaging circuit configured to compute an average value of the second corrected signal over a time interval corresponding to a training period of a transmitted signal, thereby generating an average signal value, wherein the transmitted signal has a known DC component during the training period;
an adjustment circuit configured to compute an adjustment factor reflecting an effect of the first multiplier circuit on the DC offset and to adjust the average signal value using the adjustment factor; and
an updating circuit configured to update the stored DC offset value using the adjusted average signal value.

21. The DC offset compensation circuit of claim 20 wherein the known DC component of the transmitted signal is substantially equal to zero.

22. The DC offset compensation circuit of claim 20 wherein the adjustment circuit includes:
a delay circuit configured to delay the phase correction factor by a time interval equal to half the training period;
a complex conjugate circuit configured to compute the complex conjugate of the delayed phase correction factor, thereby generating a complex conjugate signal; and
a lookup table configured to receive the carrier frequency offset estimate and to provide a value corresponding to a reciprocal of a sinc function of the product of the carrier frequency offset estimate times a time interval between samples times a number of samples in the training sequence.

23. The DC offset compensation circuit of claim 22 wherein the adjustment circuit further includes:
a second multiplier configured to multiply the complex conjugate signal by the average signal value and to provide the product as an output signal; and
a third multiplier circuit configured to multiply the output signal from the second multiplier by the value provided by the lookup table.

24. The DC offset compensation circuit of claim 20 wherein the adjustment factor is given by the expression $$\frac{e^{j2\pi((P/2)+M)\Delta f \Delta t}}{\mathrm{sinc}(\Delta f\, P\Delta t)},$$

wherein:
P is a number of samples of the received signal received during the training period;
M is a sample counter value corresponding to a first sample received during the training period;
Δt is a time interval between successive samples; and
Δf is the carrier frequency offset estimate.

25. The DC offset compensation circuit of claim 20 further comprising:
a carrier frequency offset estimation circuit configured to generate the carrier frequency offset estimate from the first corrected signal.

26. The DC offset compensation circuit of claim 20 further comprising:
a second subtraction circuit coupled to receive the average signal value and configured to subtract a value corresponding to the known DC component of the transmitted signal from the average signal value.

27. A receiver for an RF communication system, the receiver comprising:
an analog RF module configured to receive a signal and remove an RF carrier, thereby generating a baseband analog signal;
an analog-to-digital converter coupled to the analog RF module and configured to convert the baseband analog signal to a digital signal;
a carrier frequency offset estimation module coupled to receive the digital signal and configured to generate a carrier frequency offset estimate;

a DC offset compensation module configured to correct the received digital signal for a DC offset estimate; and a signal reconstruction module coupled to receive the corrected digital signal and configured to reconstruct a transmitted signal, the DC offset compensation module being further configured to compute the DC offset estimate by correcting the received digital signal for a carrier frequency offset using the carrier frequency offset estimate, averaging corrected signals corresponding to a training period of a transmitted signal, wherein the transmitted signal has a known DC component during the training period, and adjusting the averaged signal using an adjustment factor reflecting an effect on the DC offset of correcting the received digital signal for a carrier frequency offset.

28. The receiver of claim 27 wherein the known DC component of the transmitted signal is substantially equal to zero.

29. The receiver of claim 27 wherein the DC offset compensation module includes:

a subtraction circuit configured to subtract a stored DC offset value from the received digital signal, thereby producing a first corrected signal;

a phase correction circuit configured to compute a phase correction factor for each sample from the carrier frequency offset estimate;

a first multiplier circuit configured to multiply the first corrected signal by the phase correction factor, thereby producing a second corrected signal;

an averaging circuit configured to compute an average value of the second corrected signal over a time interval corresponding to a training period of a transmitted signal, thereby generating an average signal value, wherein the transmitted signal has a known DC component during the training period;

an adjustment circuit configured to compute an adjustment factor reflecting an effect of the first multiplier circuit on the DC offset and to adjust the average signal value using the adjustment factor; and an updating circuit configured to update the stored DC offset value using the adjusted average signal value.

30. The receiver of claim 29 wherein the adjustment circuit includes:

a delay circuit configured to delay the phase correction factor by a time interval equal to half the training period;

a complex conjugate circuit configured to compute the complex conjugate of the delayed phase correction factor, thereby generating a complex conjugate signal; and a lookup table configured to receive the carrier frequency offset estimate and to provide a value corresponding to a reciprocal of a sinc function of the product of the carrier frequency offset estimate times a time interval between signal samples times a number of signal samples in the training sequence.

31. The receiver of claim 30 wherein the adjustment circuit further includes:

a second multiplier configured to multiply the complex conjugate signal by the average signal value and to provide the product as an output signal; and a third multiplier circuit configured to multiply the output signal from the second multiplier by the value provided by the lookup table.

32. The receiver of claim 27 wherein the adjustment factor is given by the expression $$\frac{e^{j2\pi((P/2)+M)\Delta f \Delta t}}{\mathrm{sinc}(\Delta f P \Delta t)},$$

wherein:

P is a number of samples of the digital signal received during the training period;

M is a sample counter value corresponding to a first sample received during the training period;

$\Delta t$ is a time interval between successive samples; and $\Delta f$ is the carrier frequency offset estimate.

* * * * *